(12) United States Patent
Nogami et al.

(10) Patent No.: US 7,112,228 B2
(45) Date of Patent: Sep. 26, 2006

(54) NICKEL ELECTRODE FOR ALKALINE STORAGE BATTERY, METHOD OF PRODUCING NICKEL ELECTRODE FOR ALKALINE STORAGE BATTERY, AND ALKALINE STORAGE BATTERY

(75) Inventors: Mitsuzou Nogami, Tokushima (JP); Reizo Maeda, Hirakata (JP); Yoshinori Matsuura, Hirakata (JP); Katsuhiko Shinyama, Higashiosaka (JP); Ikuo Yonezu, Hirakata (JP); Koji Nishio, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 36 days.

(21) Appl. No.: 10/938,546

(22) Filed: Sep. 13, 2004

(65) Prior Publication Data

US 2005/0053837 A1    Mar. 10, 2005

Related U.S. Application Data

(62) Division of application No. 09/622,615, filed as application No. PCT/JP99/00720 on Feb. 18, 1999.

(30) Foreign Application Priority Data

Feb. 20, 1998   (JP)   ............................. 1998-39157
Mar. 4, 1998    (JP)   ............................. 1998-52350

(51) Int. Cl.
    *H01M 6/00*        (2006.01)
(52) U.S. Cl. .................. 29/623.5; 429/223; 429/231.1; 429/231.3; 429/231.5
(58) Field of Classification Search ............... 29/623.5; 429/223, 231.1, 231.3, 231.6
See application file for complete search history.

(56) References Cited

U.S. PATENT DOCUMENTS

| 4,603,094 A | * | 7/1986 | Yasuda ........................ 429/91 |
| 5,344,728 A | | 9/1994 | Ovshinsky et al. .......... 429/223 |
| 5,569,563 A | | 10/1996 | Ovshinsky et al. .......... 429/223 |
| 5,571,636 A | | 11/1996 | Ohta et al. .................. 429/218 |
| 5,707,764 A | | 1/1998 | Miyamoto et al. .......... 429/223 |
| 5,804,334 A | | 9/1998 | Yamamura et al. ......... 429/218 |
| 6,027,834 A | | 2/2000 | Hayashi et al. ............. 429/223 |
| 6,287,726 B1 | | 9/2001 | Ohta et al. .................. 429/223 |

FOREIGN PATENT DOCUMENTS

| EP | 0 833 397 A1 | 4/1998 |
| EP | 0 834 945 A1 | 4/1998 |
| JP | 48-50233 | 7/1973 |
| JP | 59-163753 | 9/1984 |
| JP | 62-66569 | 3/1987 |
| JP | 63-216268 | 9/1988 |
| JP | 1-200555 | 8/1989 |
| JP | 5-28992 | 2/1993 |
| JP | 5-89876 | 4/1993 |
| JP | 07-6760 | 1/1995 |

(Continued)

*Primary Examiner*—Patrick Joseph Ryan
*Assistant Examiner*—Julian Mercado
(74) *Attorney, Agent, or Firm*—Westerman, Hattori, Daniels & Adrian, LLP (57) ABSTRACT

A nickel electrode for an alkaline storage battery in which an active material mainly containing nickel hydroxide is applied to a porous sintered nickel substrate, wherein a layer containing at least one hydroxide of an element selected from a group consisting of Ca, Sr, Sc, Y, lanthanoid, and Bi is formed on a surface of the active material thus applied to the sintered nickel substrate, or between the sintered nickel substrate and the active material.

11 Claims, 3 Drawing Sheets

FOREIGN PATENT DOCUMENTS

| | | |
|---|---|---|
| JP | 07-45281 | 2/1995 |
| JP | 07-201327 | 8/1995 |
| JP | 07-272722 | 10/1995 |
| JP | 8-329937 | 12/1996 |
| JP | 09-147904 | 6/1997 |
| JP | 09-199119 | 7/1997 |
| JP | 9-265981 | 10/1997 |

* cited by examiner

NICKEL ELECTRODE FOR ALKALINE STORAGE BATTERY, METHOD OF PRODUCING NICKEL ELECTRODE FOR ALKALINE STORAGE BATTERY, AND ALKALINE STORAGE BATTERY

This application is a divisional of prior application Ser. No. 09/622,615 filed Aug. 18, 2000, which is a national stage of international application no. PCT/JP99/00720 filed on Feb. 18, 1999, the benefit of which is claimed under 35 U.S.C. §120.

TECHNICAL FIELD

The present invention relates to a nickel electrode for an alkaline storage battery in which an active material mainly containing nickel hydroxide is applied to a porous sintered nickel substrate, a method of producing the nickel electrode for an alkaline storage battery, and an alkaline storage battery employing the nickel electrode as a positive electrode. The invention is characterized in that the improvement of the nickel electrode for an alkaline storage battery for suppressing self-discharge in a case where the alkaline storage battery in a charged state is stored at high temperatures, to improve storage characteristics of the battery under high temperature conditions, and for sufficiently suppressing oxygen evolution at the early stages in a case where the alkaline storage battery is charged under high temperature conditions, to improve charge characteristics of the battery under high temperature conditions.

BACKGROUND ART

An alkaline storage battery such as a nickel-metal hydride battery or nickel-cadmium battery has conventionally employed a sintered nickel electrode or a non-sintered nickel electrode as its positive electrode.

The non-sintered nickel electrode is produced by directly applying an active material paste mainly containing nickel hydroxide to a conductive porous body such as foamed nickel. Although it can be easily produced, a disadvantage exists that it is poor in charge-discharge characteristics at high current.

On the other hand, the sintered nickel electrode employs a porous sintered nickel substrate obtained by sintering and is produced by chemically impregnating the porous sintered nickel substrate with a salt of the active material. The sintered nickel substrate presents higher conductivity. In addition, the-electrode has excellent charge-discharge characteristics at high current because of good adhesion of the active material to the porous sintered nickel substrate. On this account, an alkaline storage battery employing the sintered nickel electrode has been favorably used in an electric power tool requiring high current discharge.

Unfortunately, however, the sintered nickel electrode has a lower applying ratio of the active material than the non-sintered nickel electrode and therefor, must be improved in the utilization of the active material. In addition, in an alkaline storage battery employing the sintered nickel electrode, the above-mentioned sintered nickel substrate becomes weak due to the repeated charging and discharging of the battery. This results in low charge-discharge cycle characteristics of the battery.

On this account, there has been conventionally proposed a sintered nickel electrode wherein a layer composed of cobalt hydroxide is formed on a surface of an active material applied to a porous sintered nickel substrate, after which the layer is heat-treated in the presence of oxygen and an alkaline solution so that the cobalt hydroxide is oxidized, to improve the conductivity of the active material thereby improving the utilization thereof, as disclosed in JP, 1-200555, A. Also, there has been proposed a sintered nickel electrode wherein a layer composed of cobalt hydroxide is formed on a surface of a porous sintered nickel substrate, after which the layer is heat-treated in the presence of oxygen and an alkaline solution, and an active material mainly containing nickel hydroxide is then applied to the above-mentioned sintered nickel substrate, to inhibit the corrosion of the sintered nickel substrate during the application of the active material so that charge-discharge cycle characteristics of the battery is improve, as disclosed in JP, 63-216268, A.

Unfortunately, however, even in a case where the sintered nickel electrode produced in the manner disclosed in the above-mentioned JP, 1-200555, A is used as a positive electrode of an alkaline storage battery, the alkaline storage battery still suffers the occurrence of self discharge due to the oxygen evolution in the sintered nickel electrode when the battery in a charged state is stored at a high temperature of approximately 50° C. for a long time. Thus, the alkaline storage battery is reduced in capacity.

Also, even in a case where the sintered nickel electrode produced in the manner as disclosed in the above-mentioned JP, 63-216268, A (JP, 5-50099, B) is used as a positive electrode of an alkaline storage battery, the oxygen evolution occurs in the alkaline storage battery charged at a high temperature of approximately 50° C. before the positive-electrode is charged to full. As a result, the battery is decreased in charge efficiency.

Further, there have been proposed a sintered nickel electrode wherein a positive-electrode active material contains yttrium hydroxide to improve the utilization thereof under high temperature conditions as disclosed in JP, 48-50233, A, and a sintered nickel electrode wherein a compound such as of yttrium, indium, antimony or the like is added to an active material mainly containing nickel hydroxide to improve the utilization thereof under high temperature conditions as disclosed in JP, 5-28992, A.

However, in each of the sintered nickel electrodes disclosed in these official gazettes, the compound such as of yttrium is simply added to the active material. Therefore, the active material and the sintered nickel substrate are not sufficiently covered with the compound such as of yttrium. This detrimentally allows-electrolyte solutions contact with the active material and/or the sintered nickel substrate. Accordingly, oxygen evolution still occurs in the sintered nickel electrode under high temperature conditions, and sufficient increase in the utilization of the active materials thus can not be achieved.

An object of the present invention is to provide, in an alkaline storage battery employing as its positive electrode a sintered nickel electrode comprising a porous sintered nickel substrate having an active material mainly containing nickel hydroxide applied thereto, the alkaline storage battery with excellent storage characteristics under high temperature conditions by suppressing self-discharge due to the oxygen gas evolution in the above-mentioned nickel electrode even when the battery in a charged state is stored at high temperature for a long time.

Another object of the invention is to provide, in an alkaline storage battery employing as its positive electrode a sintered nickel electrode comprising a porous sintered nickel substrate having an active material mainly containing nickel hydroxide applied thereto, the alkaline storage battery with a sufficient battery capacity under high temperature conditions by suppressing oxygen evolution before the above-mentioned nickel electrode is charged to full when the battery is charged under high temperature conditions.

DISCLOSURE OF INVENTION

A first nickel electrode for an alkaline storage battery according to the present invention is a nickel electrode for an alkaline storage battery comprising a porous sintered nickel substrate having an active material mainly containing nickel hydroxide applied thereto, wherein a coating layer containing at least one hydroxide of an element selected from a group consisting of calcium Ca, strontium Sr, scandium Sc, yttrium Y, lanthanoid, and bismuth Bi is formed on a surface of the active material thus applied to the porous sintered nickel substrate.

In producing the above-mentioned nickel electrode for an alkaline storage battery, the active material mainly containing nickel hydroxide is applied to the porous sintered nickel substrate, after which the coating layer containing at least one hydroxide of an element selected from a group consisting of calcium Ca, strontium Sr, scandium Sc, yttrium Y, lanthanoid, and bismuth Bi is formed on the active material thus applied to the porous sintered nickel substrate.

When an alkaline storage battery is produced using the above-mentioned first nickel electrode for an alkaline storage battery as its positive electrode, the above-mentioned coating layer formed on the surface of the active material applied to the porous sintered nickel substrate serves to prevent the active material and/or the sintered nickel substrate from coming into contact with an electrolyte solution. Therefore, even in a case where the alkaline storage battery in a charged state is stored at high temperatures, the above-mentioned coating layer suppresses the oxygen gas evolution induced upon reaction of the electrolyte solution with the active material and the like, whereby storage characteristics of the battery under high temperature conditions is improved.

Examples of a hydroxide of lanthanoid used in the above-mentioned coating layer include a hydroxide of at least one element selected from the group consisting of lanthanum La, cerium Ce, praseodymium Pr, neodymium Nd, europium Eu, and ytterbium Yb.

Further, in the above-mentioned first nickel electrode for an alkaline storage battery, it is preferable that cobalt is contained in the above-mentioned hydroxide(s) in the coating layer. If an alkaline storage battery employs the nickel electrode wherein cobalt is contained in the above-mentioned hydroxide(s) in the coating layer, the cobalt is oxidized to improve the conductivity of the nickel electrode, whereby the alkaline storage battery is improved in the battery characteristics.

In forming the coating layer thus containing cobalt, when the coating layer is heat-treated in the presence of alkali and oxygen, the above-mentioned cobalt is suitably oxidized by the heat treatment, to further improve the conductivity of the nickel electrode for an alkaline storage battery. Further, unlike a case where cobalt is electrochemically oxidized at the first time of charging with the nickel electrode being used in an alkaline storage battery, the battery capacity is not decreased. Furthermore, the cobalt thus oxidized further prevents the active material from being decomposed during the storage at high temperatures, whereby the alkaline storage battery is further improved in the storage characteristics under high temperature conditions. In carrying out the heat treatment, when the temperature is too low, the effects as described above can not be sufficiently obtained. On the other hand, when the temperature is too high, the active material applied to the sintered nickel substrate is decomposed and the sintered nickel substrate corrodes. Therefore, the temperature of heat treatment is set preferably in the range of 60° C. to 100° C.

Further, in forming the coating layer using the above-mentioned hydroxides, when an amount of the above-mentioned hydroxide(s) is too small, the reaction between the electrolyte solution and the active material and the like can not be sufficiently suppressed. On the other hand, when an amount of the above-mentioned hydroxide(s) is too large, a ratio of the active material applied to the nickel electrode for an alkaline storage battery becomes low, whereby the battery cannot attain a sufficient battery capacity. Therefore, an amount of the above-mentioned hydroxide(s) is set preferably in the range of 0.5 to 5 wt % based on the total amount of all the applied materials which include the active material mainly containing nickel hydroxide.

In the above-mentioned first nickel electrode for an alkaline storage battery, it is preferred that zinc, cadmium, magnesium, cobalt, manganese, or the like is incorporated into the active material mainly containing nickel hydroxide as solid solution in order to prevent the expansion of the nickel electrode during the charge/discharge processes of the battery.

A second nickel electrode for an alkaline storage battery according to the present invention is a nickel electrode for an alkaline storage battery comprising a porous sintered nickel substrate having an active material mainly containing nickel hydroxide applied thereto, wherein an intermediate layer containing at least one hydroxide of an element selected from a group consisting of calcium Ca, strontium Sr, scandium Sc, yttrium Y, lanthanoid, and bismuth Bi is formed between the porous sintered nickel substrate and the active material.

In producing the above-mentioned nickel electrode for an alkaline storage battery, the intermediate layer containing at least one hydroxide of an element selected from a group consisting of calcium Ca, strontium Sr, scandium Sc, yttrium Y, lanthanoid, and bismuth Bi is formed on the porous sintered nickel substrate, after which the active material mainly containing nickel hydroxide is applied to the porous sintered nickel substrate having the intermediate layer thus formed thereon.

When an alkaline storage battery employs the above-mentioned second nickel electrode as its positive electrode, the intermediate layer containing the above-mentioned hydroxide(s) serves to prevent an oxygen gas evolution potential from being lower along with the rise in the temperature. Accordingly, when the alkaline storage battery is charged under high temperature conditions, oxygen gas is prevented form being generated from the nickel electrode for an alkaline storage battery, resulting in improved charging efficiency of the battery under high temperature conditions.

Examples of a hydroxide of lanthanoid used in the above-mentioned intermediate layer include a hydroxide of at least one element selected from the group consisting of lanthanum La, cerium Ce, praseodymium Pr, neodymium Nd, europium Eu, and ytterbium Yb.

Further, in the above-mentioned second nickel electrode for an alkaline storage battery, it is preferable that cobalt, together with the above-mentioned hydroxide(s), is contained in the intermediate layer or that a second intermediate layer composed of cobalt hydroxide is formed on the intermediate layer. If cobalt is contained in the intermediate layer, or the second intermediate layer composed of cobalt hydroxide is formed on the intermediate layer, as respectively described above, the sintered nickel substrate is prevented form being corroded to be oxidized during the application of the above-mentioned active material. Moreover, when the nickel electrode for an alkaline storage battery is used in an alkaline storage battery, the cobalt contained in the intermediate layer or the cobalt hydroxide in the second intermediate layer is oxidized to improve the conductivity of the nickel electrode, resulting in improved battery characteristics. Particularly, greater effects are obtained in a case where the second intermediate layer is formed on the intermediate layer.

In forming the intermediate layer containing cobalt or forming the second intermediate layer composed of cobalt hydroxide on the intermediate layer as respectively described above, when the intermediate layer or the second intermediate layer is heat-treated in the presence of alkali and oxygen, the cobalt contained in the intermediate layer or the cobalt hydroxide in the second intermediate layer is suitably oxidized by the heat treatment, to further improve the conductivity of the nickel electrode for an alkaline storage battery. Further, unlike a case where the cobalt contained in the intermediate layer or the cobalt hydroxide in the second intermediate layer is electrochemically oxidized at the first time of charging with the nickel electrode for an alkaline storage battery being used in the alkaline storage battery, the battery capacity is not decreased. In carrying out the heat treatment, when the temperature is too low, the effects as described above can not be sufficiently obtained. On the other hand, when the temperature is too high, the sintered nickel substrate corrodes. Therefore, the temperature of heat treatment is set preferably in the range of 60° C. to 100° C.

Furthermore, in the second nickel electrode for an alkaline storage battery, it is also preferred that zinc, cadmium, magnesium, cobalt, manganese, or the like is incorporated into the active material mainly containing nickel hydroxide as solid solution for the prevention of the expansion of the nickel electrode during the charge/discharge processes of the battery.

BEST MODE FOR CARRYING OUT THE INVENTION

A nickel electrode for an alkaline storage battery, a method of producing the nickel electrode for an alkaline storage battery, and an alkaline storage battery according to examples of the present invention will be specifically described, and the excellent features thereof will be clarified by comparison with comparative examples. The nickel electrode for an alkaline storage battery, the method of producing the nickel electrode for an alkaline storage battery, and the alkaline storage battery in the present invention are not particularly limited to those described in the following examples, and can be embodied by being suitably changed within a range in which the gist thereof is not changed.

EXAMPLES A1 TO A11

In the present examples, a porous sintered nickel substrate prepared in the following manner was used to produce each nickel electrode for an alkaline storage battery.

In preparation of the porous sintered nickel substrate, carbonyl nickel powder and a binder was kneaded to adjust a nickel slurry, and the slurry was applied to a punching metal having a thickness of 50 µm. The slurry on the punching metal was dried, and then sintered in a reducing atmosphere, to obtain the porous sintered nickel substrate. The porous sintered nickel substrate thus obtained had a porosity of approximately 85% and a thickness of 0.65 mm.

Next, the porous sintered nickel substrate was immersed in a mixed solution of nickel nitrate and cobalt nitrate (specific gravity: 1.75, atomic ratio between nickel and cobalt: 10:1) so that the mixed solution was impregnated into the porous sintered nickel substrate, after which the sintered nickel substrate was immersed in a 25% KOH aqueous solution so that hydroxides of nickel and cobalt were deposited on the sintered nickel substrate. The above-mentioned operation was repeated 6 times, to apply an active material mainly containing nickel hydroxide to the above-mentioned sintered nickel substrate.

Figure 1:
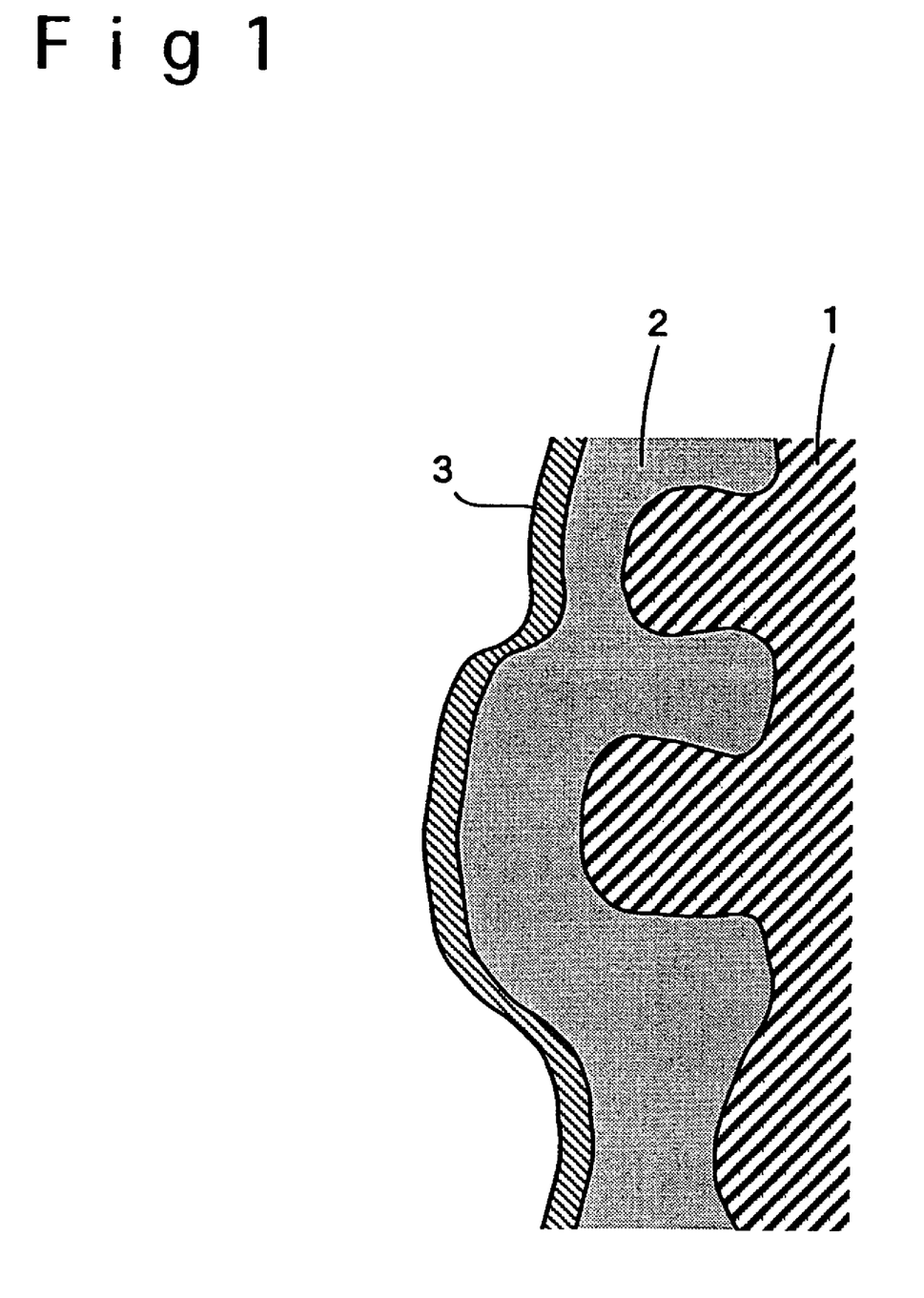
FIG. 1 is a schematic sectional view showing a state in which a coating layer composed of various hydroxides is formed on the active material applied to a porous sintered nickel substrate as in the present examples.

Subsequently, each coating layer 3 composed of a corresponding hydroxide shown in the following table 1 was formed on the active material 2 mainly containing nickel hydroxide applied to the sintered nickel substrate 1, as shown in FIG. 1.

Aqueous solutions of 3 wt % nitrates were respectively prepared using calcium nitrate in the example A1; strontium nitrate in the example A2; scandium nitrate in the example A3; yttrium nitrate in the example A4; lanthanum nitrate in the example A5; cerium nitrate in the example A6; praseodymium nitrate in the example A7; neodymium nitrate in the example A8; europium nitrate in the example A9; ytterbium nitrate in the example A10; and bismuth nitrate in the example A11.

Each of the sintered nickel substrates having the active material mainly containing nickel hydroxide applied thereto was immersed in the above-mentioned corresponding nitrate aqueous solution and then in a 25% NaOH aqueous solution at 80° C. to form each coating layer composed of the hydroxide of the above-mentioned corresponding element on the active material applied to the sintered nickel substrate. Each of the nickel electrodes for alkaline storage batteries was thus produced. Each coating layer of the above-mentioned each hydroxide formed on the active material in the above-mentioned manner had a constant weight per unit area of 5 to 6 mg/cm$^2$. Further, an amount of the hydroxide in each coating layer was approximately 3 wt % based on the total amount of all the applied materials which include the active material.

Further, when each of the active materials forming the coating layers as described above was analyzed by an X-ray diffraction method, a peak of the hydroxide of the above-mentioned each element was observed in addition to a peak of the nickel hydroxide. It was thus confirmed that the coating layer composed of the hydroxide of the above-mentioned each element was formed on the active material.

Although FIG. 1 is presented as a schematic sectional view of the present examples, it should be noted here that the active material 2 mainly containing nickel hydroxide and the coating layer 3 composed of the hydroxide may be partially broken or may not be observed as a totally independent layer.

Comparative Example a1

In the comparative example a1, a sintered nickel substrate having an active material mainly containing nickel hydroxide applied thereto was used as a nickel electrode for an alkaline storage battery as in the above-mentioned examples A1 to A11, and a coating layer was not formed on the active material applied to the sintered nickel substrate.

Comparative Example a2

In the comparative example a2, an active material mainly containing nickel hydroxide was applied to a porous sintered nickel substrate in the same manner as that in the above-mentioned examples A1 to A11. Subsequently, the sintered nickel substrate was immersed in an aqueous solution of 3 wt % cobalt nitrate and then in a NaOH aqueous solution so that cobalt hydroxide was deposited on the active material applied to the sintered nickel substrate. After that, the sintered nickel substrate wetted with the NaOH aqueous solution was heat-treated in the atmosphere, that is in the presence of oxygen, at a temperature of 80° C. so that the above-mentioned cobalt hydroxide was oxidized.

A nickel electrode for an alkaline storage battery wherein a layer composed of cobalt hydroxide was formed on the active material was thus produced. It should be noted here that the nickel electrode for an alkaline storage battery thus produced is equivalent to the nickel electrode for an alkaline storage battery disclosed in the above-mentioned JP, 1-200555, A.

Comparative Example a3

In the comparative example a3, in applying an active material to a porous sintered nickel substrate obtained in the same manner as that in the above-mentioned examples A1 to A11, a mixed aqueous solution of nickel nitrate, cobalt nitrate, and yttrium nitrate (specific gravity: 1.75, atomic ratio between nickel, cobalt, and yttrium: 10:1:0.81) was used, and the sintered nickel substrate was immersed in the mixed aqueous solution so that the mixed solution was impregnated into the porous sintered nickel substrate. An active material mainly containing nickel hydroxide and additionally cobalt hydroxide and yttrium hydroxide was then applied to the sintered nickel substrate in the same manner as that in the above-mentioned examples A1 to A11 to produce a nickel electrode for an alkaline storage battery. A coating layer was not formed on the active material applied to the sintered nickel substrate. It should be noted here that the nickel electrode for an alkaline storage battery thus produced is equivalent to the nickel electrode for an alkaline storage battery disclosed in the above-mentioned JP, 48-50233, A.

Next, each of the nickel electrodes for alkaline storage batteries in the above-mentioned examples A1 to A11 and comparative examples a1 to a3 produced in the above-mentioned manner was used as a positive electrode, a hydrogen absorbing alloy electrode was used as a negative electrode, and a potassium hydroxide aqueous solution with normality 6 was used as a electrolyte solution to produced each alkaline storage battery having a battery capacity of 1.0 Ah.

Each of the above-mentioned alkaline storage batteries was charged at a charging current of 100 mA for 16 hours, and then discharged at a discharge current of 200 mA to a battery voltage of 1.0 V. The above-mentioned charging and discharging were considered as one cycle. 10 cycles of charging and discharging were performed at room temperature. After 11th cycle of-charging was performed, each of the above-mentioned alkaline storage batteries was committed to two-week storage at a temperature of 50° C. and thereafter, returned to place at room temperature. Each of the above-mentioned alkaline storage batteries was discharged to a battery voltage of 1.0 V to find a discharging capacity $Q_{11}$ at the 11th cycle time. The discharging capacity $Q_{11}$ at the 11th cycle time was compared with a discharging capacity $Q_{10}$ at the 10th cycle time, which is before the storage, and the charge characteristics under high temperature conditions was calculated on the basis of the following equation. The results are shown in the following Table 1.

Storage characteristics (%)=$(Q_{11}/Q_{10})\times 100$

TABLE 1

| | Materials of Coating Layer | Storage Characteristics (%) |
|---|---|---|
| Example A1 | $Ca(OH)_2$ | 64 |
| Example A2 | $Sr(OH)_2$ | 58 |
| Example A3 | $Sc(OH)_3$ | 64 |
| Example A4 | $Y(OH)_3$ | 66 |
| Example A5 | $La(OH)_3$ | 58 |
| Example A6 | $Ce(OH)_3$ | 62 |
| Example A7 | $Pr(OH)_3$ | 59 |
| Example A8 | $Nd(OH)_3$ | 58 |
| Example A9 | $Eu(OH)_3$ | 61 |
| Example A10 | $Yb(OH)_3$ | 63 |
| Example A11 | $Bi(OH)_3$ | 62 |
| Comparative Example a1 | — | 49 |
| Comparative Example a2 | $Co(OH)_2$ | 54 |
| Comparative Example a3 | — | 50 |

As apparent from the results, the alkaline storage batteries in the examples A1 to A11 employing the nickel electrodes for alkaline storage batteries wherein the coating layers respectively composed of hydroxides of Ca, Sr, Sc, Y, La, Ce, Pr, Nd, Eu, Yb, and Bi were formed on the active materials mainly containing nickel hydroxides applied to the sintered nickel substrates were significantly improved in the storage characteristics under high temperature conditions, as compared with the alkaline storage battery in the comparative example a1 employing the nickel electrode for an alkaline storage battery wherein no coating layer was formed, the alkaline storage battery in the comparative example a2 employing the nickel electrode for an alkaline storage battery wherein the coating layer composed of the heat-treated cobalt hydroxide was formed, and the alkaline storage battery in the comparative example a3 employing the nickel electrode for an alkaline storage battery wherein cobalt hydroxide and yttrium hydroxide were contained in the active material mainly containing nickel hydroxide.

EXAMPLES A4.1 TO A4.9

In each of the examples A4.1 to A4.9, an active material mainly containing nickel hydroxide was applied to a sintered nickel substrate in the same manner as that in the above-mentioned examples A1 to A11. Subsequently, in forming a coating layer on the active material thus applied to the sintered nickel substrate, a nitrate aqueous solution of yttrium was used to form a coating layer composed of yttrium hydroxide $Y(OH)_3$, as in the above-mentioned example A4.

In the examples A4.1 to A4.9, the nitrate aqueous solutions of yttrium were varied in the concentration (W1) of yttrium nitrate within the range of 0.1 to 7 wt % as shown in the following Table 2. Coating layers were formed using such nitrate aqueous solutions of yttrium, to produce each nickel electrode for an alkaline storage battery containing yttrium hydroxide in the weight percentage (W2) of 0.1 to 7 wt % based on the total amount of the yttrium hydroxide and the active material, as shown in the same table.

Each of the nickel electrodes for an alkaline storage batteries in the examples A4.1 to A4.9 produced in the above-mentioned manner was used as a positive electrode to produce each alkaline storage battery having a battery capacity of 1.0Ah in the same manner as that in the above-mentioned examples A1 to A11. Discharge capacities $Q_{10}$ at the 10th cycle time and $Q_{11}$ at the 11th cycle time were measured to find storage characteristics under high temperature conditions. The results, along with that of the above-mentioned example A4, are shown in the following Table 2.

TABLE 2

|  | Materials of Coating Layer | W1 (wt %) | W2 (wt %) | $Q_{10}$ (mAh/g) | Storage Characteristics (%) |
|---|---|---|---|---|---|
| Example A4.1 | $Y(OH)_3$ | 0.1 | 0.1 | 228 | 58 |
| Example A4.2 | $Y(OH)_3$ | 0.3 | 0.3 | 230 | 60 |
| Example A4.3 | $Y(OH)_3$ | 0.5 | 0.5 | 233 | 62 |
| Example A4.4 | $Y(OH)_3$ | 1 | 1 | 235 | 64 |
| Example A4.5 | $Y(OH)_3$ | 2 | 2 | 235 | 65 |
| Example A4 | $Y(OH)_3$ | 3 | 3 | 235 | 66 |
| Example A4.6 | $Y(OH)_3$ | 4 | 4 | 230 | 67 |
| Example A4.7 | $Y(OH)_3$ | 5 | 5 | 228 | 68 |
| Example A4.8 | $Y(OH)_3$ | 6 | 6 | 223 | 68 |
| Example A4.9 | $Y(OH)_3$ | 7 | 7 | 219 | 68 |

As apparent from the results, in forming the coating layer composed of yttrium hydroxide on the active material applied to the sintered nickel substrate, when the yttrium hydroxide was contained in the weight percentage of 0.5 to 5 wt % based on the total amount of the yttrium hydroxide and the active material, the battery was improved in the storage characteristics under high temperature conditions and attained the high discharge capacity. Although the above-mentioned examples A4.1 to A4.9 present a case where a coating layer composed of yttrium hydroxide was formed on the active material applied to the sintered nickel substrate, substantially the same results are obtained when a coating layer is composed of a hydroxide of element selected from the group consisting of calcium, strontium, scandium, lanthanoid, and bismuth.

EXAMPLES B1 TO B4

In each of the examples B1 to B4, an active material mainly containing nickel hydroxide was applied to a sintered nickel substrate in the same manner as that in the above-mentioned examples A1 to A11.

In forming coating layers on the active materials thus applied to the sintered nickel substrates, there were used aqueous solutions of 3 wt % nitrate obtained by mixing calcium nitrate and strontium nitrate in the weight ratio of 1:1 in the example B1; calcium nitrate and cobalt nitrate in the weight ratio of 1:1 in the example B2; yttrium nitrate and cobalt nitrate in the weight ratio of 1:1 in the example B3; and bismuth nitrate and cobalt nitrate in the weight ratio of 1:1 in the example B4.

Coating layer were formed on the active materials in the same manner as that of the above-mentioned examples A1 to A11. As shown in the following Table 3, there were formed coating layers respectively composed of a mixture of $Ca(OH)_2$ and $Sr(OH)_2$ in the example B1; a mixture of $Ca(OH)_2$ and $Co(OH)_2$ in the example B2; a mixture of $Y(OH)_3$ and $Co(OH)_2$ in the example B3; and a mixture of $Bi(OH)_3$ and $Co(OH)_2$ in the example B4, to obtain nickel electrodes for alkaline storage batteries.

Each of the nickel electrodes for alkaline storage batteries in the examples B1 to B4 produced in the above-mentioned manner was used as a positive electrode to produce each alkaline storage battery having a battery capacity of 1.0 Ah in the same manner as that in the above-mentioned examples A1 to A11. Discharge capacities $Q_{10}$ at the 10th cycle time and $Q_{11}$ at the 11th cycle time were measured to find storage characteristics under high temperature conditions. The results, along with those of the above-mentioned examples A1, A4, and A11, are shown in the following Table 3.

TABLE 3

|  | Materials of Coating Layer | Storage Characteristics (%) |
|---|---|---|
| Example B1 | $Ca(OH)_2 + Sr(OH)_2$ | 66 |
| Example B2 | $Ca(OH)_2 + Co(OH)_2$ | 69 |
| Example B3 | $Y(OH)_3 + Co(OH)_2$ | 72 |
| Example B4 | $Bi(OH)_3 + Co(OH)_2$ | 70 |
| Example A1 | $Ca(OH)_2$ | 64 |
| Example A4 | $Y(OH)_3$ | 66 |
| Example A11 | $Bi(OH)_3$ | 62 |

As apparent from the results, in forming the coating layer on the active material applied to the sintered nickel substrate, each of the alkaline storage batteries in the examples B1 and B4 employing the nickel electrode for an alkaline storage battery wherein the coating layer composed of a mixture of two types of hydroxides was formed were improved in the storage characteristics under high temperature conditions, as compared with the alkaline storage batteries in the examples A1, A4, and A11 employing the nickel electrodes for alkaline storage batteries wherein coating layers respectively composed of a hydroxide of calcium, yttrium, and bismuth were formed. Particularly, each of the alkaline storage batteries in the examples B2 and B4 employing the nickel electrode for an alkaline storage battery wherein the coating layer having a cobalt hydroxide mixed therein was formed was further improved in the storage characteristics under high temperature conditions. Although the examples B1 to B4 present a case where two types of hydroxides were mixed to form a coating layer, it should be noted here that more than two types of hydroxides may be mixed to form a coating layer.

EXAMPLES C1 TO C6

In each of the examples C1 to C6, an active material mainly containing nickel hydroxide was applied to a sintered nickel substrate in the same manner as that in the above-mentioned examples A1 to A11. Subsequently, in forming coating layers on the active materials thus applied to the sintered nickel substrates, there were formed coating layers composed of a mixture of $Ca(OH)_2$ and $Co(OH)_2$ in the example C1 as in the above-mentioned example B2; $Y(OH)_3$ and $Co(OH)_2$ in the example C2 as in the above-mentioned example B3; $Bi(OH)_3$ and $Co(OH)_2$ in the example C3 as in the above-mentioned example B4; $Sc(OH)_3$ and $Co(OH)_2$ in the example C4 in the similar manner to that in the above-mentioned examples B1 to B4; $La(OH)_3$ and $Co(OH)2$ in the example C5; and $Yb(OH)_3$ and $Co(OH)_2$ in the example C6.

In the examples C1 to C6, in forming each coating layer as described above, each sintered nickel substrates having the active materials applied thereto was immersed in the above-mentioned corresponding nitrate aqueous solution and then in a NaOH aqueous solution so that each hydroxide was deposited on the active material applied to the sintered nickel substrate. Subsequently, each of the sintered nickel substrates wetted with the NaOH aqueous solutions was heat-treated in the atmosphere, that is in the presence of oxygen, at a temperature of 80° C. so that cobalt hydroxide in the above-mentioned each hydroxide was oxidized, to form each coating layer.

Each of the nickel electrodes for alkaline storage batteries in the examples C1 to C6 produced in the above-mentioned manner was used as a positive electrode to produce each alkaline storage battery having a battery capacity of 1.0 Ah in the same manner as that in the above-mentioned examples A1 to A11. Discharge capacities $Q_{10}$ at the 10th cycle time and $Q_{11}$ at the 11th cycle time were measured to find storage characteristics under high temperature conditions. The results, along with those of the above-mentioned examples B2 to B4, are shown in the following Table 4.

TABLE 4

|  | Materials of Coating Layer | Heat Treatment | Storage Characteristics (%) |
| --- | --- | --- | --- |
| Example C1 | $Ca(OH)_2 + Co(OH)_2$ | yes | 72 |
| Example C2 | $Y(OH)_3 + Co(OH)_2$ | yes | 77 |
| Example C3 | $Bi(OH)_3 + Co(OH)_2$ | yes | 75 |
| Example C4 | $Sc(OH)_2 + Co(OH)_2$ | yes | 76 |
| Example C5 | $La(OH)_3 + Co(OH)_2$ | yes | 72 |
| Example C6 | $Yb(OH)_3 + Co(OH)_2$ | yes | 74 |
| Example B2 | $Ca(OH)_2 + Co(OH)_2$ | no | 69 |
| Example B3 | $Y(OH)_3 + Co(OH)_2$ | no | 72 |
| Example B4 | $Bi(OH)_3 + Co(OH)_2$ | no | 70 |

As apparent from the results, in forming the coating layer on the active material applied to the sintered nickel substrate, the alkaline storage batteries in the examples C1 to C6 employing the nickel electrodes for alkaline storage batteries wherein the coating layers respectively composed of calcium hydroxide, yttrium hydroxide, bismuth hydroxide, and the like mixed with cobalt hydroxides were formed on the active materials applied to the sintered nickel substrates by the heat treatment in the presence of alkali and oxygen were further improved in the storage characteristics under high temperature conditions, as compared with the alkaline storage batteries in the examples B2 to B4 employing the nickel electrodes for an alkaline storage batteries wherein the coating layers were formed without performing heat treatments.

EXAMPLES D1 TO D11

In the examples D1 to D11, porous sintered nickel substrates produced in the same manner as that in the above-mentioned examples A1 to A11 were used.

Figure 2:
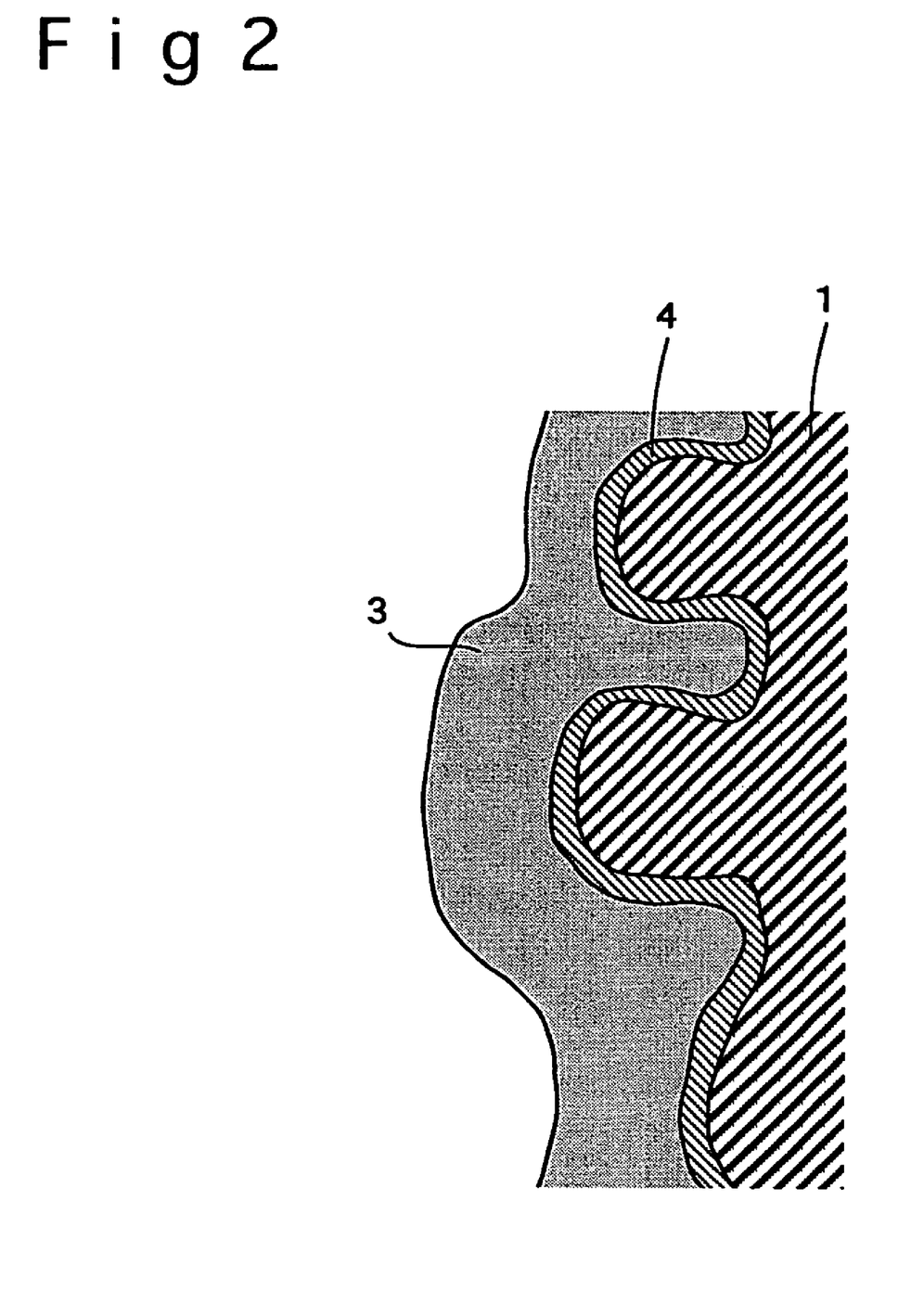
FIG. 2 is a schematic sectional view showing a state in which an intermediate layer composed of various hydroxides is formed on a porous sintered nickel substrate, and an active material is then applied to the sintered nickel substrate having the intermediate layer thus formed thereon as in the present examples.
Figure 3:
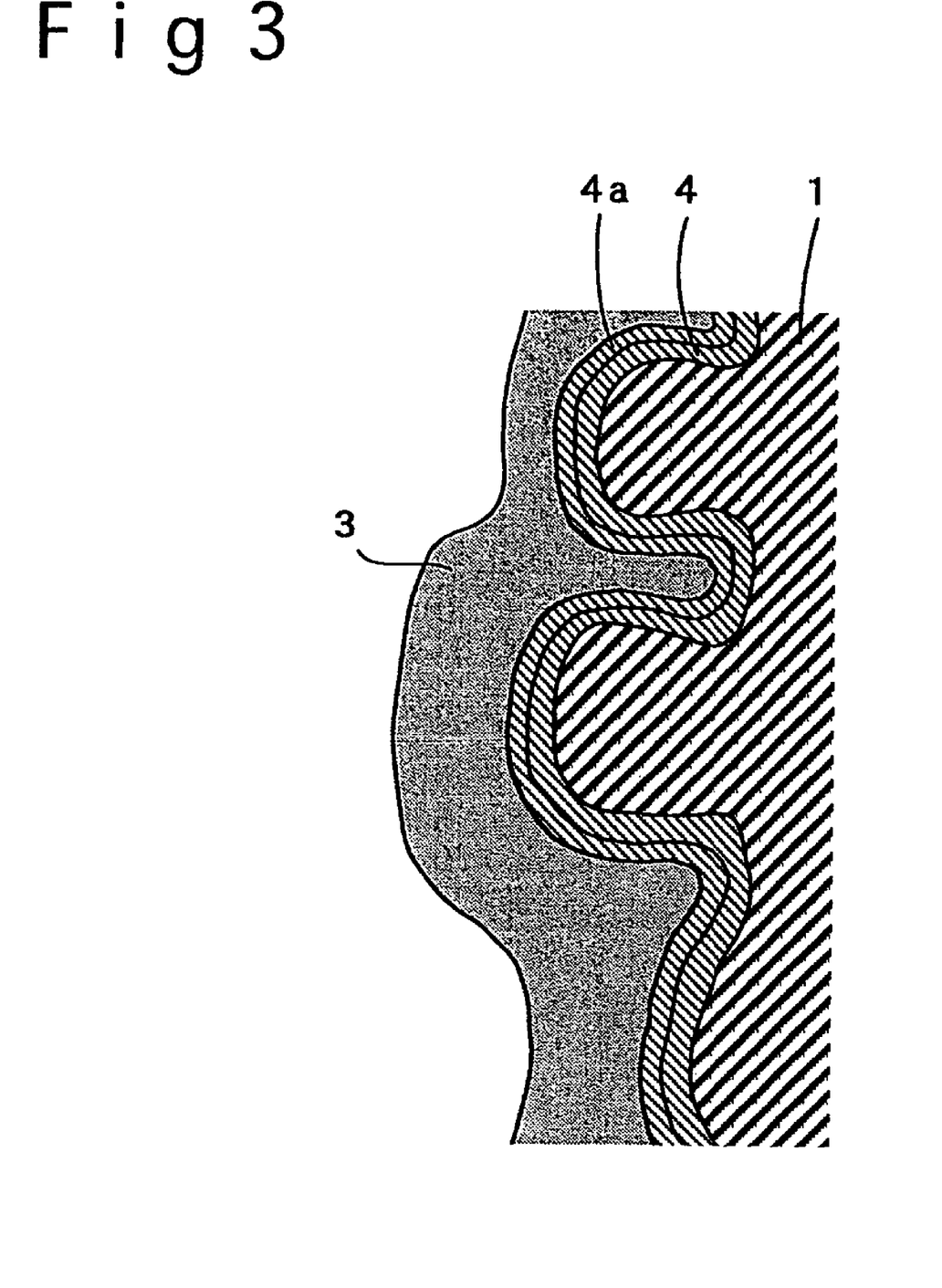

In the examples D1 to D11, each intermediate layer 4 composed of a corresponding hydroxide shown in the following Table 5 was formed on the above-mentioned sintered nickel substrate 1, and an active material 3 mainly containing nickel hydroxide was then applied to the sintered nickel substrate 1 thus having the intermediate layer 4 formed thereon, as shown in FIG. 2.

In forming each intermediate layer 4 composed of the corresponding hydroxide shown in the following Table 5, aqueous solutions of 10 wt % nitrates were respectively prepared using calcium nitrate in the example D1; strontium nitrate in the example D2; scandium nitrate in the example D3; yttrium nitrate in the example D4; lanthanum nitrate in the example D5; cerium nitrate in the example D6; praseodymium nitrate in the example D7; neodymium nitrate in the example D8; europium nitrate in the example D9; ytterbium nitrate in the example D10; and bismuth nitrate in the example D11.

Then, each of the above-mentioned sintered nickel substrates was immersed in the above-mentioned corresponding nitrate aqueous solution and then in a 25% NaOH aqueous solution at 80° C. to form thereon each intermediate layer composed of the corresponding hydroxide shown in the following Table 5. The presence of the above-mentioned intermediate layer was confirmed by X-ray diffraction analysis. Each intermediate layer of the above-mentioned corresponding hydroxide formed on the sintered nickel substrate in the above-mentioned manner had a constant weight per unit area of 8 to 10 mg/cm$^2$.

Next, in applying the active material mainly containing nickel hydroxide to each sintered nickel substrate thus having the intermediate layer formed thereon, each sintered nickel substrate was immersed in a mixed solution of nickel nitrate and cobalt nitrate (specific gravity: 1.75, atomic ratio between nickel and cobalt: 10:1) so that the mixed solution was impregnated into the porous sintered nickel substrate, after which the sintered nickel substrate was immersed in a 25% NaOH aqueous solution so that hydroxides of nickel and cobalt were deposited on the sintered nickel substrate. The same operation was repeated 6 times, to apply the active material mainly containing nickel hydroxide to the above-mentioned sintered nickel substrate. Each of the nickel electrodes for alkaline storage batteries was thus produced. An amount of the hydroxide in each intermediate layer was approximately 5 wt % based on the total amount of the all the applied materials which include the active material.

Although FIG. 2 is presented as a schematic sectional view of the present examples, it should be noted here that the intermediate layer 4 composed of the hydroxide and the active material 3 mainly containing nickel hydroxide may be partially broken or may not be observed as a totally independent layer.

Comparative Example d1

In the comparative example d1, a sintered nickel substrate having an active material mainly containing nickel hydroxide applied thereto was used as a nickel electrode for an alkaline storage battery as in the above-mentioned comparative examples a1, and an intermediate layer was not formed on the sintered nickel substrate.

Comparative Example d2

In the comparative example d2, a porous sintered nickel substrate produced in the same manner as that in the above-mentioned examples A1 to A11 was used. The sinered nickel substrate was then immersed in an aqueous solution of 3 wt % cobalt nitrate and then in a NaOH aqueous solution so that cobalt hydroxide was deposited on the sintered nickel substrate. Subsequently, the sintered nickel substrate wetted with the NaOH aqueous solution was heat-treated in the atmosphere, that is in the presence of oxygen, at a temperature of 80° C. so that cobalt hydroxide in the above-mentioned cobalt hydroxide was oxidized, to form an intermediate layer. After that, an active material mainly containing nickel hydroxide was applied to the sintered nickel substrate having the intermediate layer thus formed thereon to produce a nickel electrode for an alkaline storage battery as in the above-mentioned examples D1 to D11. It should be noted here that the nickel electrode for an alkaline storage battery thus produced is equivalent to the nickel electrode for an alkaline storage battery disclosed in the above-mentioned JP, 63-216268, A (JP, 5-50099, C).

Next, each of the nickel electrodes for alkaline storage batteries in the above-mentioned examples D1 to D11 and comparative examples d1 and d2 produced in the above-mentioned manner was used as a positive electrode, a hydrogen absorbing alloy electrode was used as a negative electrode, and a potassium hydroxide aqueous solution with normality 6 was used as a electrolyte solution to produce each alkaline storage battery having a battery capacity of 1.0 Ah.

Each of the above-mentioned alkaline storage batteries was charged at a charging current of 100 mA for 16 hours, and then discharged at a discharge current of 200 mA to a battery voltage of 1.0 V. The above-mentioned charging and discharging were considered as one cycle. 10 cycles of charging and discharging were performed at room temperature, after which 11th cycle of charging was performed at a high temperature of 50° C. Subsequently, each of the above-mentioned alkaline storage batteries was returned to place at room temperature so that each of the above-mentioned alkaline storage batteries was discharged to a battery voltage of 1.0 V. A discharging capacity $q_{10}$ at the 10th cycle time and a discharging capacity $q_{11}$ at the 11th cycle time were compared with each other, and the charge characteristics under high temperature conditions was calculated on the basis of the following equation. The results are shown in the following Table 5.

Charge characteristics (%)=$(q_{11}/q_{10})\times 100$

TABLE 5

| | Materials of Intermediate Layer | Charge characteristics (%) |
| --- | --- | --- |
| Example D1 | Ca(OH)$_2$ | 72 |
| Example D2 | Sr(OH)$_2$ | 68 |
| Example D3 | Sc(OH)$_3$ | 73 |
| Example D4 | Y(OH)$_3$ | 77 |
| Example D5 | La(OH)$_3$ | 68 |
| Example D6 | Ce(OH)$_3$ | 70 |
| Example D7 | Pr(OH)$_3$ | 70 |
| Example D8 | Nd(OH)$_3$ | 71 |
| Example D9 | Eu(OH)$_3$ | 73 |
| Example D10 | Yb(OH)$_3$ | 72 |
| Example D11 | Bi(OH)$_3$ | 73 |
| Comparative Example d1 | — | 46 |
| Comparative Example d2 | Co(OH)$_2$ | 58 |

As apparent from the results, the alkaline storage batteries in the examples D1 and D11 employing the nickel electrodes for alkaline storage batteries wherein the active material mainly containing nickel hydroxide was applied to the sintered nickel substrate having the intermediate layers respectively composed of hydroxides of Ca, Sr, Sc, Y, La, Ce, Pr, Nd, Eu, Yb, and Bi formed thereon were improved in the charge characteristics under high temperature conditions, as compared with the alkaline storage battery in the comparative example d1 employing the nickel electrode for an alkaline storage battery wherein no intermediate layer was formed, and the alkaline storage battery in the comparative example d2 employing the nickel electrode for an alkaline storage battery wherein the intermediate layer composed of heat-treated cobalt hydroxide was formed. Further, in forming the intermediate layers composed of one hydroxide of element selected from the group consisting of Ca, Sr, Sc, Y, La, Ce, Pr, Nd, Eu, Yb, and Bi on the sintered nickel substrate, when the weight ratio of the hydroxide to the total amount of the hydroxide and the active material is set to the range of 0.5 to 5 wt %, the batteries are improved in charge characteristics under high temperature conditions and attain large discharge capacities.

EXAMPLES E1 TO E3

In the examples E1 to E3, in forming intermediate layers on the above-mentioned porous sintered nickel substrates, there were used calcium nitrate aqueous solution in the example E1 as in the above-mentioned example D1; yttrium nitrate aqueous solution in the example E2 as in the above-mentioned example D4; and bismuth nitrate aqueous solution in the example E3 as in the above-mentioned example D11.

In the examples E1 to E3, the sintered nickel substrates were respectively immersed in the above-mentioned corresponding nitrate aqueous solutions, and then in 25% NaOH aqueous solutions, after which the sintered nickel substrates wetted with the NaOH aqueous solutions were heat-treated in the atmosphere, that is in the presence of oxygen, at a temperature of 80° C. for one hour, to form intermediate layers respectively composed of Ca(OH)$_2$, Y(OH)$_3$, and Bi(OH)$_3$ as shown in the following Table 6. After that, each nickel electrode for an alkaline storage battery was produced in the same manner as that in the above-mentioned examples D1 to D11.

Each of the nickel electrodes for alkaline storage batteries in the examples E1 to E3 produced as above was used as a positive electrode to produce each alkaline storage battery having a battery capacity of 1.0 Ah in the same manner as that in the above-mentioned examples D1 to D11. Also, discharge capacities $q_{10}$ at the 10th cycle time and $q_{11}$ at the 11th cycle time were measured in the same manner as that in the above-mentioned examples D1 to D11, to find charge characteristics under high temperature conditions. The results, along with those of the above-mentioned examples D1, D4, and D11, are shown in the following Table 6.

TABLE 6

| | Materials of Intermediate Layer | Heat Treatment | Charge Characteristics (%) |
| --- | --- | --- | --- |
| Example E1 | Ca(OH)$_2$ | yes | 74 |
| Example E2 | Y(OH)$_3$ | yes | 78 |
| Example E3 | Bi(OH)$_3$ | yes | 77 |
| Example D1 | Ca(OH)$_2$ | no | 72 |

TABLE 6-continued

| | Materials of Intermediate Layer | Heat Treatment | Charge Characteristics (%) |
|---|---|---|---|
| Example D2 | Y(OH)$_3$ | no | 77 |
| Example D3 | Bi(OH)$_3$ | no | 73 |

As apparent from the results, the alkaline storage batteries in the examples E1 to E3 employing the nickel electrodes for alkaline storage batteries wherein heat treatments were performed in forming intermediate layers respectively composed of hydroxides of calcium, yttrium, and bismuth were improved in the charge characteristics under high temperature conditions, as compared with the alkaline storage batteries in corresponding examples D1 to D3 employing the nickel electrodes for alkaline storage batteries wherein heat treatments were not performed in forming the intermediate layers. In carrying out the heat treatment, when the temperature is too low, further improvement of the charge characteristics under high temperature conditions can not be achieved. On the other hand, if the temperature is too high, the sintered nickel substrate corrodes to degrade the battery characteristics. Therefore, the temperature of heat treatment is set preferably in the range of 60° C. to 100° C.

EXAMPLES F1 TO F7

In the examples F1 to F7, in forming intermediate layers on the above-mentioned porous sintered nickel substrates, there were used aqueous solutions of 10 wt % nitrates respectively obtained by mixing calcium nitrate and strontium nitrate in the weight ratio of 1:1 in the example F1; calcium nitrate and cobalt nitrate in the weight ratio of 1:1 in the example F2; scandium nitrate and cobalt nitrate in the weight ratio of 1:1 in the example F3; yttrium nitrate and cobalt nitrate in the weight ratio of 1:1 in the example F4; lanthanum nitrate and cobalt nitrate in the weight ratio of 1:1 in the example F5; ytterbium nitrate and cobalt nitrate in the weight ratio of 1:1 in the example F6; and bismuth nitrate and cobalt nitrate in the weight ratio of 1:1 in the example F7.

Then, as in the above-mentioned examples E1 to E3, each of the sintered nickel substrates was immersed in the above-mentioned corresponding nitrate aqueous solution and then in a 25% NaOH aqueous solution, after which the sintered nickel substrate wetted with the NaOH aqueous solution was heat-treated in the atmosphere at a temperature of 80° C. for one hour. As shown in the following Table 7, there were formed intermediate layers respectively composed of a mixture of Ca(OH)$_2$ and Sr(OH)$_2$ in the example F1; Ca(OH)$_2$ and Co(OH)$_2$ in the example F2; Sc(OH)$_2$ and Co(OH)$_2$ in the example F3; Y(OH)$_3$ and Co(OH)$_2$ in the example F4; La(OH)$_3$ and Co(OH)$_2$ in the example F5; Yb(OH)$_3$ and Co(OH)$_2$ in the example F6; and Bi(QH)$_3$ and Co(OH)$_2$ in the example F7. After that, each nickel electrode for an alkaline storage battery was produced in the same manner as that in the above-mentioned examples D1 to D11.

Each of the nickel electrodes for alkaline storage batteries in the examples F1 to F7 produced as above was used as a positive electrode, and each alkaline storage battery having a battery capacity of 1.0 Ah was produced in the same manner as that in the above-mentioned examples D1 to D11. Discharge capacities $q_{10}$ at the 10th cycle time and $q_{11}$ at the 11th cycle time were measured to find charge characteristics under high temperature conditions. The results, along with those of the above-mentioned examples E1 to E3, are shown in the following Table 7.

TABLE 7

| | Materials of Intermediate Layer | Heat Treatment | Charge Characteristics (%) |
|---|---|---|---|
| Example F1 | Ca(OH)$_2$ + Sr(OH)$_2$ | yes | 79 |
| Example F2 | Ca(OH)$_2$ + Co(OH)$_2$ | yes | 81 |
| Example F3 | Sc(OH)$_2$ + Co(OH)$_2$ | yes | 82 |
| Example F4 | Y(OH)$_3$ + Co(OH)$_2$ | yes | 87 |
| Example F5 | La(OH)$_3$ + Co(OH)$_2$ | yes | 82 |
| Example F6 | Yb(OH)$_3$ + Co(OH)$_2$ | yes | 85 |
| Example F7 | Bi(OH)$_3$ + Co(OH)$_2$ | yes | 86 |
| Example E1 | Ca(OH)$_2$ | yes | 74 |
| Example E2 | Y(OH)$_3$ | yes | 78 |
| Example E3 | Bi(OH)$_3$ | yes | 77 |

As apparent from the results, each of the alkaline storage batteries in the examples F1 to F7 employing the nickel electrode for an alkaline storage battery wherein the above-mentioned two types of hydroxides were heat-treated to form the intermediate layer was improved in the charge characteristics under high temperature conditions, as compared with each of the alkaline storage battery in the examples E1 to E3 employing the nickel electrode for an alkaline storage battery wherein one type of hydroxide of an element selected from the group consisting of calcium, yttrium, and bismuth was heat-treated to form the intermediate layer. Particularly, each of the alkaline storage batteries in the examples F2 to F7 employing the nickel electrode for an alkaline storage battery wherein hydroxides including hydroxide of cobalt were heat-treated to form the intermediate layer was further improved in the charge characteristics under high temperature conditions. Further, in forming the intermediate layer having cobalt hydroxide in addition to a hydroxide of calcium or the like, an amount of cobalt hydroxide was set preferably in the range of 1 to 5 wt % based on the total amount of the hydroxide and the active material.

EXAMPLES G1 TO G6

In the examples G1 to G6, in forming intermediate layers on the above-mentioned porous sintered nickel substrates, aqueous solutions of 5 wt % nitrates were respectively prepared using calcium nitrate in the example G1; scandium nitrate in the example G2; yttrium nitrate in the example G3; lanthanum (La) nitrate in the example G4; ytterbium nitrate in the example G5; and bismuth nitrate in the example G6. Then, the above-mentioned sintered nickel substrates were immersed in the above-mentioned corresponding nitrate aqueous solutions and then in 25% NaOH aqueous solutions at 80° C. to form the intermediate layers respectively composed of Ca(OH)$_2$, Sc(OH)$_3$, Y(OH)$_3$, La(OH)$_3$, Yb(OH)$_3$, and Bi(OH)$_3$ on the sintered nickel substrates.

Subsequently, each sintered nickel substrate having the intermediate layer thus formed thereon was immersed in the aqueous solution of 5 wt % cobalt nitrate and then in a 25% NaOH aqueous solution, after which the sintered nickel substrate wetted with the NaOH aqueous solution was heat-treated in the atmosphere at a temperature of 80° C. for one hour, to form a second intermediate layer composed of a hydroxide of cobalt on the above-mentioned intermediate layer. After that, each nickel electrode for an alkaline storage battery was produced in the same manner as that in the above-mentioned examples D1 to D11.

Each of the nickel electrodes for alkaline storage batteries in the examples G1 to G6 produced as above was used as a positive electrode, and each alkaline storage battery having a battery capacity of 1.0 Ah was produced in the same manner as that in the above-mentioned examples D1 to D11. Discharge capacities $q_{10}$ at the 10th cycle time and $q_{11}$ at the 11th cycle time were measured to find charge characteristics under high temperature conditions. The results, along with those of the above-mentioned examples F2 to F7, are shown in the following Table 8.

TABLE 8

|  | Materials and State of Intermediate layer | Charge Characteristics (%) |
| --- | --- | --- |
| Example G1 | Lamination of $Ca(OH)_2$ and $Co(OH)_2$ | 87 |
| Example G2 | Lamination of $Sc(OH)_3$ and $Co(OH)_2$ | 89 |
| Example G3 | Lamination of $Y(OH)_3$ and $Co(OH)_2$ | 90 |
| Example G4 | Lamination of $La(OH)_3$ and $Co(OH)_2$ | 89 |
| Example G5 | Lamination of $Yb(OH)_3$ and $Co(OH)_2$ | 86 |
| Example G6 | Lamination of $Bi(OH)_3$ and $Co(OH)_2$ | 88 |
| Example F2 | Mixture of $Ca(OH)_2$ and $Co(OH)_2$ | 81 |
| Example F3 | Mixture of $Sc(OH)_3$ and $Co(OH)_2$ | 82 |
| Example F4 | Mixture of $Y(OH)_3$ and $Co(OH)_2$ | 87 |
| Example F5 | Mixture of $La(OH)_3$ and $Co(OH)_2$ | 82 |
| Example F6 | Mixture of $Yb(OH)_3$ and $Co(OH)_2$ | 85 |
| Example F7 | Mixture of $Bi(OH)_3$ and $Co(OH)_2$ | 86 |

As apparent from the results, each of the alkaline storage batteries in the examples G1 to G7 employing the nickel electrode for an alkaline storage battery wherein the intermediate layer composed of the hydroxide of calcium or the like was formed on the sintered nickel substrate, and the second intermediate layer composed of the hydroxide of cobalt was then laminated on the intermediate layer was further improved in the charge characteristics under high temperature conditions, as compared with each of the alkaline storage batteries in the examples F2 to F7 employing the nickel electrode for an alkaline storage battery wherein the intermediate layer composed of the mixture of the hydroxide of calcium or the like and the hydroxide of cobalt was formed.

The above-mentioned examples only illustrates a case where a coating layer containing a hydroxide of calcium or the like is formed on a surface of an active material formed on a porous sintered nickel substrate and a case where an intermediate layer containing a hydroxide of calcium or the like is formed between a porous sintered nickel substrate and an active material. However, it is also possible to form an intermediate layer containing a hydroxide of calcium or the like between a porous sintered nickel substrate and an active material along with forming a coating layer containing a hydroxide of calcium or the like on a surface of the active material thus formed on the sintered nickel substrate.

INDUSTRIAL APPLICABILITY

As described in detail above, in the first nickel electrode for an alkaline storage battery according to the present invention, a coating layer containing at least one hydroxide of an element selected from a group consisting of calcium Ca, strontium Sr, scandium Sc, yttrium Y, lanthanoid, and bismuth Bi is formed on a surface of an active material applied to a porous sintered nickel substrate. Therefore, when an alkaline storage battery is produced using the first nickel electrode for an alkaline storage battery according to the present invention as a positive electrode, the above-mentioned coating layer serves to prevent the active material and/or the sintered nickel substrate from contacting with an electrolyte solution. Accordingly, even in a case where the alkaline storage battery in a charged state is stored under high temperature conditions, the above-mentioned coating layer inhibits the oxygen gas evolution induced upon reaction of the electrolyte solution with the active material and the like, whereby the alkaline storage battery with excellent storage characteristics under high temperature conditions is obtained.

Further, in the second nickel electrode for an alkaline storage batteries according to the present invention, an intermediate layer containing at least one hydroxide of an element selected from a group consisting of calcium Ca, strontium Sr, scandium Sc, yttrium Y, lanthanoid, and bismuth Bi is formed between a porous sintered nickel substrate and an active material. Therefore, when an alkaline storage battery is produced using the second nickel electrode for an alkaline storage battery according to the present invention as a positive electrode, the intermediate layer containing the above-mentioned hydroxide(s) serves to prevent an oxygen gas evolution potential from being lower along with the rise in the temperature. Therefore, when the alkaline storage battery is charged under high temperature conditions, oxygen gas is prevented form being generated from the nickel electrode for an alkaline storage battery, whereby the alkaline storage battery with excellent charge characteristics under high temperature conditions is obtained.

The invention claimed is:

1. A method of producing a nickel electrode for an alkaline storage battery, comprising:
    providing a porous sintered nickel substrate;
    applying an active material mainly containing nickel hydroxide to the porous sintered nickel substrate to form an active material layer; and
    forming a coating layer containing at least one hydroxide of an element selected from a group consisting of calcium Ca, strontium Sr, scandium Sc, yttrium Y, lanthanoid, and bismuth Bi on a surface of the active material layer thus applied to the porous sintered nickel substrate.

2. The method of producing a nickel electrode for an alkaline storage battery according to claim 1, wherein said coating layer contains cobalt.

3. The method of producing a nickel electrode for an alkaline storage battery according to claim 2, wherein said coating layer containing cobalt is heat-treated in the presence of alkali and oxygen.

4. The method of producing a nickel electrode for an alkaline storage battery according to claim 1, wherein said lanthanoid is at least one element selected from the group consisting of lanthanum La, cerium Ce, praseodymium Pr, neodymium Nd, europium Eu, and ytterbium Yb.

5. The method of producing a nickel electrode for an alkaline storage battery according to claim 1, wherein an amount of said hydroxide in the coating layer is set in the range of 0.5 to 5 wt % based on the total amount of all the applied materials which includes the active material mainly containing nickel hydroxide.

6. A method of producing a nickel electrode for an alkaline storage battery, comprising:
    providing a porous sintered nickel substrate;
    forming an intermediate layer containing at least one hydroxide of an element selected from a group consisting of calcium Ca, strontium Sr, scandium Sc, yttrium Y, lanthanoid, and bismuth Bi on the porous sintered nickel substrate; and applying an active material mainly containing nickel hydroxide to the porous sintered nickel substrate having the intermediate layer formed thereon, to form an active material layer.

7. The method of producing a nickel electrode for an alkaline storage battery according to claim 6, wherein said intermediate layer contains cobalt.

8. The method of producing a nickel electrode for an alkaline storage battery according to claim 7, wherein, in forming said intermediate layer containing cobalt, the intermediate layer is heat-treated in the presence of alkali and oxygen.

9. The method of producing a nickel electrode for an alkaline storage battery according to claim 6, wherein lanthanoid used for forming the intermediate layer is at least one element selected from the group consisting of lanthanum La, cerium Ce, praseodymium Pr, neodymium Nd, europium Eu, and ytterbium Yb.

10. A method of producing a nickel electrode for an alkaline storage battery, comprising:

providing a porous sintered nickel substrate;

forming a first intermediate layer containing at least one hydroxide of an element selected from a group consisting of calcium Ca, strontium Sr, scandium Sc, yttrium Y, lanthanoid, and bismuth Bi on the porous sintered nickel substrate;

forming a second intermediate layer composed of cobalt hydroxide on said intermediate layer; and applying an active material mainly containing nickel hydroxide to the porous sintered nickel substrate having the first and second intermediate layers formed thereon, to form an active material layer.

11. The method of producing a nickel electrode for an alkaline storage battery according to claim 10, wherein, in forming said second intermediate layer, the second intermediate layer is heat-treated in the presence of alkali and oxygen.

* * * * *